United States Patent [19]
Abella et al.

[11] Patent Number: 6,130,402
[45] Date of Patent: Oct. 10, 2000

[54] SYSTEM AND PROCESS FOR MARKING OR PERFORATING

[75] Inventors: Jordi Llado Abella; Ramon Sans Ravellat; Jose Miguel Ibanez Baron, all of Manresa, Spain

[73] Assignee: Servicio Industrial De Marcaje Y Codification, S.A., Manresa, Spain

[21] Appl. No.: 08/981,260

[22] PCT Filed: Apr. 25, 1997

[86] PCT No.: PCT/ES97/00107

§ 371 Date: Oct. 2, 1998

§ 102(e) Date: Oct. 2, 1998

[87] PCT Pub. No.: WO97/40957

PCT Pub. Date: Nov. 6, 1997

[30] Foreign Application Priority Data

| Apr. 26, 1996 | [ES] | Spain | 9600962 |
| May 9, 1996 | [ES] | Spain | 9601050 |
| Nov. 11, 1996 | [ES] | Spain | 9602373 |

[51] Int. Cl.$^7$ .................................................. B23K 26/08
[52] U.S. Cl. .............................. 219/121.68; 219/121.69; 219/121.7; 219/121.71; 219/121.79
[58] Field of Search ...................... 219/121.62, 121.68, 219/121.69, 121.7, 121.71, 121.73, 121.78, 121.79, 121.8, 121.82, 121.85, 121.6; 347/256, 260; 359/305; 700/166

[56] References Cited

U.S. PATENT DOCUMENTS

| 4,321,564 | 3/1982 | Tregay . |
| 4,645,900 | 2/1987 | Heyden ............................ 219/121.67 |

(List continued on next page.)

FOREIGN PATENT DOCUMENTS

| 0295682 | 12/1988 | European Pat. Off. . |
| 0400476 | 5/1990 | European Pat. Off. . |
| 0402298 | 7/1993 | European Pat. Off. . |
| 4106127 | 9/1992 | Germany . |
| 2013193 | 4/1990 | Spain . |
| 21 33 52 | 7/1984 | United Kingdom . |
| 2133352 | 7/1984 | United Kingdom . |

*Primary Examiner*—Gregory Mills
*Attorney, Agent, or Firm*—Darby & Darby

[57] ABSTRACT

The invention relates to a system for marking or perforating by laser and to a marking or perforation process in said system, which is comprised of at least one laser (19) which produces a beam, a supply unit for at least one laser (19), a control means (12) with a control program which controls the laser (19), a deflector (16) particularly an optical-acoustic deflector which produces different beam deflection angles, in this case an optical system traversed by the beam, which produces a marking or a perforation configured like a matrix of points (n×m) on a surface of a product in relative motion between the product to be marked or perforated and the laser beam. The supply unit and/or the deflector (16) may be controlled by the control program. The system of the invention provides for a dynamic control of the marking or perforation resolution in a vertical direction.

48 Claims, 4 Drawing Sheets

U.S. PATENT DOCUMENTS

| | | |
|---|---|---|
| 4,740,269 | 4/1988 | Berger et al. . |
| 4,922,077 | 5/1990 | Gordon . |
| 4,992,890 | 2/1991 | Pinard et al. . |
| 5,021,631 | 6/1991 | Ravellat ............................. 219/121.68 |
| 5,092,350 | 3/1992 | Arthur et al . . |
| 5,252,257 | 10/1993 | Bryant et al. . |
| 5,259,401 | 11/1993 | Lange et al. . |
| 5,309,178 | 5/1994 | Gross ...................................... 347/255 |
| 5,653,900 | 8/1997 | Clement et al. ................... 219/121.68 |
| 5,837,962 | 11/1998 | Overbeck ........................... 219/121.68 |

SYSTEM AND PROCESS FOR MARKING OR PERFORATING

DESCRIPTION

The invention relates to a system of marking or perforating moving objects with a laser, driven by a controlled power source.

STATE OF THE ART

The coding of products, for example, in the pharmaceuticals, foodstuffs and cosmetics industries, requires reliable and permanent identification. The use of a laser beam produces a micro volatilisation of the surface of the material to be marked, thus achieving a permanent and indelible marking whilst the product is on the production line.

The use of lasers for marking moving products on production belts is already known. These systems have an acoustic-optical deflector on which the laser beam is made to reflect and to which, moreover, a given frequency is applied to produce the deflection of the beam. The angle of deflection depends directly on the value of the frequency applied to the deflector, in such a way that a different angle of deflection corresponds to each frequency applied.

European patent No. 0402298 refers to a system of marking moving objects by means of a laser.

In this system, the angle of deflection depends on the value of the frequency of an RF signal that is applied to the deflector, so that a different angle of deflection corresponds to each frequency applied. A number of fixed oscillators of different frequencies are used that are applied to the acoustic-optical deflector through a switching circuit that is controlled by a control circuit that selects the frequency to apply.

The fact that the number of fixed oscillators is a predetermined quantity results in a limited number of frequencies, and therefore, in a limited number of points. If it is wished that the resolution of the marking be increased, the number of oscillators and the control logic have to be increased, which means an increase in their cost. Furthermore, it is known that the efficiency characteristic of the acoustic-optical deflector is not linear in the working frequency band.

OBJECT OF THE INVENTION

An object of the invention is to create a system and a procedure for marking or perforating products by laser that improve and facilitate the marking or perforation.

The invention has many advantages.

The system, according to the invention, illustrated in FIG. 1, affords dynamic control of the resolution for marking or perforation of points in a vertical direction. This system also allows the exposure time to the laser beam for each marking or perforation point to be controlled. Hence the dependence on marking is reduced when faced with changes in speed on production lines.

The system, according to the invention, allows automatic equalisation of the width to be carried out and allows the positioning of the points of marking or perforation to be controlled in the region where the efficiency of the deflector is maximum. In this sense, the system lets the equalisation be carried out depending on the energy time for the point (this is the time that the laser beam coincides within the area corresponding to the point) and allows a mixed equalisation by changing the width and the energy time for the point. The system also allows the energy of the marking or perforation to be controlled and works with relatively short switching times (for example, less than a microsecond).

In practice, this system allows marking with messages in alphanumerical characters, serial numbers, time and date of manufacture, coding sequence, logotypes etc. with various heights and widths at a speed of up to 2,000 metres per minute and over 10,000 characters per second. Furthermore, the system complies with all the specifications for the Class IV laser in accordance with the EN 60825 standard and with the CDRH (Centre for Devices and Radiological Health).

The system, according to the invention, illustrated in FIGS. 2 and 3 allows the adaptation of a low average-power laser with a high capacity for accumulation of energy and generation of high peak powers in short periods of time. Hence, a reduction in the cost is achieved in the system for marking or perforation.

The system, according to the invention, illustrated in FIG. 4 allows a perforation to be made on the surface of a given material with great precision for the diameter of the orifices of the perforation. It also provides high precision in the distance existing between the centres of the orifices on the surface of the product to be perforated.

The system, according to the invention, also provides automatic control of the porosity that results as a consequence of the orifices made in a given surface.

The invention is applicable in those industrial processes in which orifices must be made on the surface of a given material. One of several examples is the sector of the paper for rolling cigarettes for giving the cigarette filter a constant porosity and achieving a richer mixture of air in the smoke generated by burning tobacco. Other examples are financial documents and documents that require precise codes in order to prevent falsifications.

The system for dynamic perforation permits "on line" control of the porosity for which purpose it includes a porosity meter, which generates a signal that allows the dynamic perforation system to automatically change the set of parameters shown, therefore the production, for example, of the paper for the cigarette filter is improved.

In the following, the invention is described on the basis of the attached drawings.

DESCRIPTION OF THE INVENTION

1. Description Based on the Drawings 1.1 FIG. 1

Figure 1:
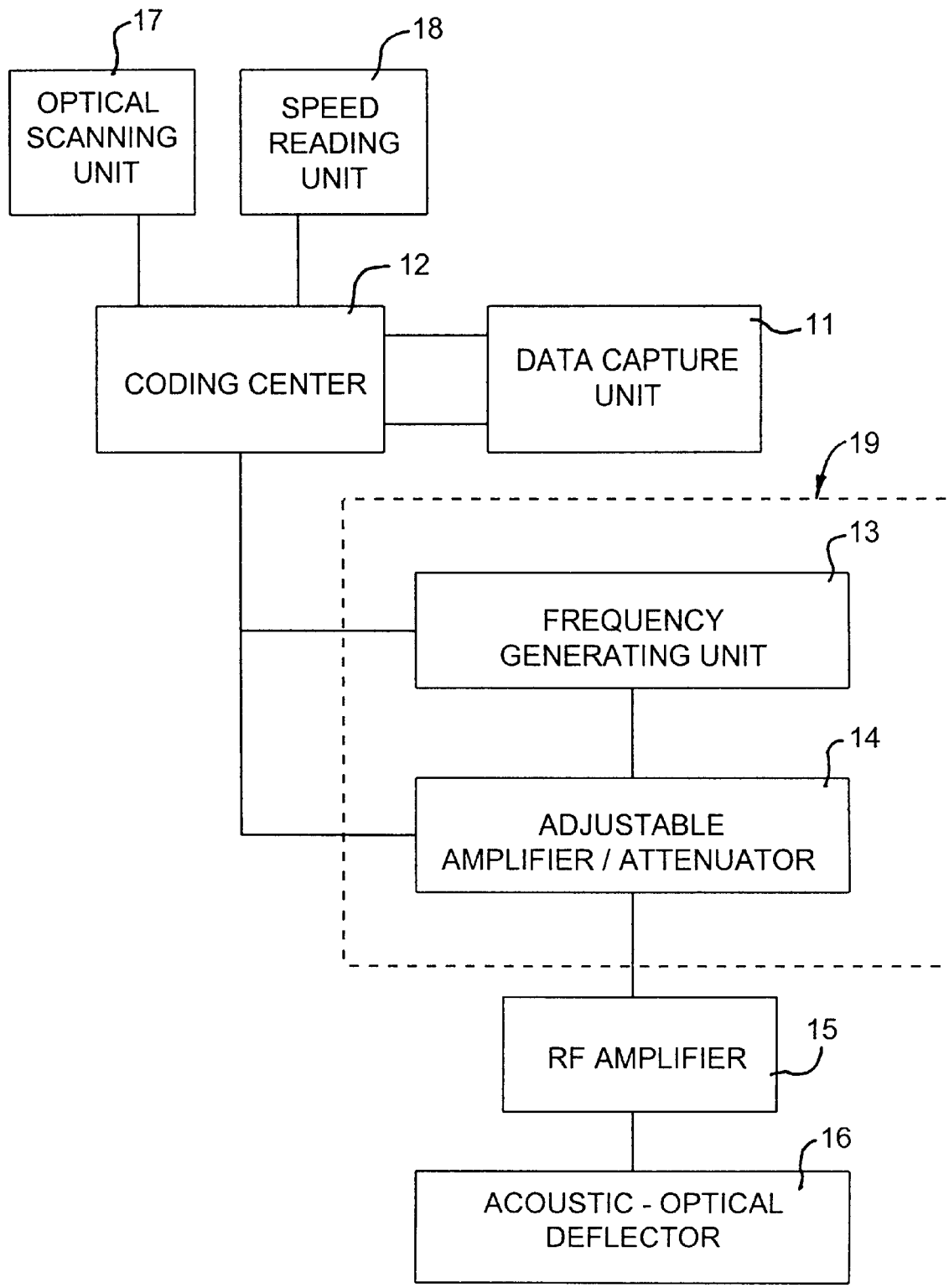
FIG. 1 shows a functional block diagram of a first embodiment of the system according to the invention.

The first example for carrying out the system according to the invention illustrated in FIG. 1, is a system for the random generation of frequencies for marking or perforating using a laser.

This system incorporates the following components: a data capture unit 11; a control and coding centre 12 with a control program that dynamically controls the resolution for marking or perforation; a frequency generating unit 13; an adjustable amplifier and/or adjustable attenuator 14; an RF amplifier 15; an acoustic-optical deflector 16; an optical scanning unit (photocell) 17, a device 18 that reads the speed of a belt, on which the product to be marked or perforated is located and a frequency generating unit 19.

The frequency generating unit 19 is preferably made up by a frequency Direct Digital Synthesiser 13 that produces signals of a given frequency that are applied to the acoustic-optical deflector 16. The centre or means of control 12 generates a digital code for each point in the matrix.

The control means or centre 12 generates a sequence of digital signals that produce a frequency sweep, at least equivalent to the bandwidth of the acoustic-optical deflector 16. Furthermore, the unit or control centre 12 obtains the characteristic response curve of the acoustic-optical deflector 16 in its working band.

The control unit controls the amplifier and/or the attenuator 14 on the basis of the characteristic response curve of the acoustic-optical deflector 16 for equalising the response by, (at least, in one part of the working band for the deflector), correcting any lack of linearity of the laser power deflected as compared with the width of different RF frequencies applied thereto.

In particular, the control means 12 changes the equalisation by means of the energy time for the point and/or by changing the RF power applied to the deflector.

As shall be described, the control unit 12 determines what is the optimum area for marking or perforation, depending on the characteristic curve stored for the acoustic-optical deflector 16 and the message to be marked or perforated.

In order to determine the optimum area for marking, the control unit 12 determines what the bandwidth is for the frequencies in the message, sweeps for frequencies along the band of frequencies for the deflector, calculates the area corresponding to the bandwidth centred on the frequency for exploration and selects the frequency that corresponds to the maximum value of the area calculated.

This example of the system, according to the invention consists of a system for the random generation of frequencies for marking or perforation by means of a laser that has an acoustic-optical deflector onto which it is applied, through the constant gain RF amplifier 15, different values of frequency that produce different angles of deflection of the laser beam that bounces off the deflector 16, thereby marking or perforating the character, logotype, texts, etc.

This information to be marked or to be perforated is entered into the information capture unit 11 that generates a digitalised matrix, nxm, of points corresponding to the marking or perforation to be carried out, and stores it in a memory.

n is the number of points on the vertical line (i.e., the direction perpendicular to the linear movement of the product to be marked) and m is the number of points in the direction of the travel of the product to be marked.

The control and coding unit or means 12 processes the points of the matrix obtained in the information capture unit 11 and generates a digital code for each point in the matrix.

The control and coding unit 12 is connected to the frequency generating unit 13 that directly produces a given frequency based on the digital code provided by the control and coding unit.

The control unit 12 incorporates the means for performing the dynamic control of the resolution for the marking (constituted by the control program), they consist of generating a larger or smaller amount of points n and therefore a larger or smaller amount of frequencies.

The bandwidth amplifier and/or attenuator 14 is run by the control and coding centre 12 in order to equalise the response throughout the whole working band of the acoustic-optical deflector. It also corrects the non linearity of the laser power deflected as compared to the bandwidth of the different frequencies of radio frequency (RF) applied thereto.

The width attenuator and/or amplifier 14 is preferably included in the frequency generating unit 13, in which case the set is also made up by a DDS.

The control and coding unit is equipped with the means (constituted by the control program) for generating a sequence of digital values that produces a sweep of frequencies in the working band for the acoustic-optical deflector, so that using equipment for measuring the laser power, the characteristic response curve of the acoustic-optical deflector 16 is obtained throughout its whole working bandwidth.

Means for storing the characteristic curve of the acoustic-optical deflector that are preferably included in the control and coding centre.

The control and coding centre is equipped with means for controlling the response of the amplifier and/or attenuator, according to the stored characteristic curve of the acoustic-optical deflector, which corrects the non linearity of the response of the acoustic-optical deflector. To do so, it determines the curve of compensation of the response of the bandwidth of the acoustic-optical deflector, and the latter is stored in the amplifier and/or attenuator.

So, once the characteristic curve of the amplifier has been calculated and stored in the control and coding centre, it calculates the curve for compensating the response of bandwidth of the acoustic-optical deflector by storing it, for example, in the amplifier and/or attenuator, as was mentioned earlier, so as then to carry out the following steps.

1. The number of points to be marked is selected;
2. A search is made within the working band of the deflector 16 of the region where its response is the maximum for the points previously selected;
3. Within the region selected in the previous point a search is made for the minimum efficiency.
4. All the values of minimum efficiency are made equal by means of a reduction in the RF power in each one down to the efficiency of the frequencies, using the amplifier and/or attenuator, and
5. The information storage is carried out.

Furthermore, the control unit 12 has the means (control program) for determining which is the optimum area for marking or perforating, depending on the characteristic curve stored for the acoustic-optical deflector and the message to be marked. It should also be pointed out that the control of the resolution may be done using the optimum area of marking of the characteristic curve and of the message.

In order to calculate the optimum area for marking or perforating, the average efficiency is calculated (the average of the values of corresponding to the discrete frequencies in the area), the variance (difference between the maximum value and the minimum value) for these values, and the minimum value of the efficiency in the areas for marking or perforating.

On the basis of these calculations the system, according to the invention, performs a sweep throughout the bandwidth of the deflector calculating these three parameters for each one of the search areas. Once calculated, a value is obtained for each area that is the result R of the following equation:

Result $R = K1 \cdot M + K2 \cdot V + K3 \cdot P$ where:
- M is the average efficiency in each area;
- V is the variance in each area;
- P is the minimum of the efficiency in each area;
- K1, K2, K3 are preestablished constants.

It is recommended that the area selected should have a maximum average efficiency, a minimum variance and a maximum value of minimum efficiency.

The maximum result of the equation obtained determines the optimum area for marking or perforating.

The control and coding unit in this system is equipped with means for changing the equalisation from the energy time for the point, that is to say, that depending on the time that is used for carrying out the marking for each point the equalisation is performed with the aim of achieving a constant marking energy in the used bandwidth.

The system, according to the invention, is also capable of performing a mixed equalisation changing the time of point and the bandwidth on the basis of that described earlier.

In order to achieve the equalisation of the message to be marked or to be perforated the following operations are performed:

1. RF power is adjusted in order to achieve the maximum laser power;
2. The control and coding circuit reads the efficiencies obtained in the bandwidth of the deflector and stores these values;
3. It performs the positioning within the bandwidth of the deflector in order to achieve the optimum area for marking;
4. Within the area selected in the preceding point, it determines the maximum efficiency;
5. It adjusts the RF power for each one of the points in order to achieve the maximum efficiency, hence at this point using the amplifier it amplifies the RF power for each one of the frequencies;
6. It increases the energy time for the point at those points where the efficiency is lower, as is described in FIG. 4; and
7. If it is necessary, the equalisation is adjusted by means of a reduction in power at the points that may turn out to be deformed if the energy times for the point were too long; and
8. The marking or the perforation of the message is carried out.

Furthermore, the control and coding means includes means (control program) for changing the energy time for the point, depending on the energy of the laser and speed of the production line and thus determine the appropriate energy for the marking. This allows the quality of the marking or the perforation to be made resistant to the changes in the speed of the production line.

The criterion for selecting the energy for marking is based, for example, on the observation of the marking by an operator, therefore the control and coding unit has the means for changing the energy time for the point manually, carried out by the operator, who works the means described above.

The means for changing the energy time for the point consist of maintaining the digital signal generated by the control and coding centre for a longer or shorter period of time.

In this example of the system, according to the invention, it also allows the pulsed working of the laser to be controlled, therefore the control and coding centre generates signals for activating the laser to coincide with the generation of each one of the frequencies or variable set of frequencies that make up the message.

On the basis of that described, the following major advantages for this example of the invention may be stated:
- It allows the resolution of the marking or perforation and the control there to be increased, thereby achieving different character heights;
- It allows the automatic equalisation of the width of the deflected laser to be performed;
- It allows the equalisation to be performed by means of the RF power;
- It allows the equalisation to be performed according to the energy time for the point;
- It allows mixed equalisation by changing the width and the energy time for marking the point;
- It allows the energy for the marking or perforation to be controlled;
- It allows a high number of frequencies to be generated:
- It works with very short switching times; and
- It is relatively cheap.

This system for marking with laser equipment uses a RF amplifier 15 with constant gain that applies a RF signal with a variable frequency to the acoustic-optical deflector 16 onto which the laser beam is fired, in such a way that the beam is deflected at an angle proportional to the frequency applied through the amplifier 15, therefore a marking or perforation made on the product that travels along a production belt.

The information to be marked or perforated on the product is entered into the information capture unit 11 that is connected to the control and coding centre 12 that in turn is connected to the frequency generating unit 19, that is connected by means of the amplifier and/or attenuator 14 to the constant gain RF amplifier 15.

Using the information capture unit 11 the text, character, logotype. bar code, etc. are entered that are to be marked or perforated, for which purpose it includes a reading unit that is interactive with the user.

This information may be entered in several different ways such as the following possibilities:
- using a block chart with software designed for memorising points in real time;
- using an optical reader associated to the system;
- using a computer-aided graphic design program.

The digital information capture unit 11 apart from having the reader unit that is interactive with the user is fitted with the means for obtaining a digitalised matrix (n×m) corresponding to the marking or perforation to be performed. Furthermore it is equipped with a message storage unit through which the connection to the control and coding centre is made and in which the matrix of points n×m is stored.

The unit 11 verifies when a new information has to be processed, in which case it proceeds to perform a new conversion.

The stored n×m matrixes will later be sent to the control and coding centre 12.

The control and coding centre processes the different points stored in the memory and obtains a value belonging to a digital code for each one of the points in the matrix that corresponds to the frequency that has to be applied to the acoustic-optical deflector 16, that is to say, the value digital in K bits defines a specific frequency in the frequency generation unit 19.

In the control and coding centre, the size of the character to be printed and/or the number of points is stored that are wanted for each vertical line, in such a way that these data may be changed at in any time, thereby achieving a dynamic change for the resolution.

The frequency generation unit 19 is preferably made up by a direct digital synthesiser of frequencies (DDS) that, based on the value of the digital code provided by the control and coding centre 12, directly generates a stable frequency with a very short switching time, for example, less than a microsecond, that is applied to the acoustic-optical deflector 16 through the corresponding amplifiers and/or attenuators 14 as was described earlier.

Thanks to the flexibility that the DDS provides for generating different frequencies, the system offers the possibility of achieving the different heights of character stated above and allows total control over the number of points generated in the direction of the Y axis that constitute the points n on the line vertical.

Initially the control and coding centre 12 generates a sequence of digital values that produces a frequency sweep by the DDS, throughout the whole bandwidth of the acoustic-optical deflector 16 so that if it measures the energy of the laser beam deflected, according to the different angles in which the laser beam has been deflected onto the acoustic-optical deflector 16, the characteristic response curve for the acoustic-optical deflector is obtained for its whole bandwidth.

Once the response curve for the acoustic-optical deflector has been obtained in all its bandwidth, it is preferably stored in the control and coding centre 12 thus it may determine which is the optimum area for marking according to the stored characteristic curve of the acoustic-optical deflector and of the message.

On the basis of these data as obtained by the control and coding centre 12, the latter calculates the curve of compensation for the bandwidth response for the acoustic-optical deflector that is stored in the amplifier and/or attenuator 14 that, for example, is programmable, so that equalisation can be achieved for the response of the acoustic-optical deflector 26 in all its working band thus correcting the alinearity that the latter demonstrates in its bandwidth.

The programming of the compensation curve is carried out by the control centre 12 before performing the marking, keeping this programming until the matrix of the points has been changed.

In the event that the amplifier and/or attenuator 14 is not programmable, the compensation curve may be stored in the control and coding centre 12 and the latter may carry on sending the orders for working to the amplifier and/or attenuator in real time.

On basis of that described, it is understood that when a photocell 17 detects the presence of a product that must be marked or perforated, it sends a signal to the control and coding centre 12 which requests the recovery of a message stored in the storage unit.

At this point, the control and coding centre takes charge of reading each vertical line (points n of the matrix) so as to be able to establish the digital word corresponding to the frequency for each point to be marked.

By changing the energy time for the point, the equalisation of the alinearity of the response of the acoustic-optical deflector may also be performed, without any need to use an amplifier and/or attenuator 14 or in combination with the latter, performing a mixed equalisation.

The amplifier and/or attenuator 14 performs the double function of equalising the response curve for the deflector and adjusting the maximum laser power at each frequency.

As has already been mentioned, the equalisation may performed in two ways:

Equalisation by means of the bandwidth for each one of the frequencies selected, as has been described;

Equalisation by means the energy time for the point, with prior adjustment to maximum efficiency for the acoustic-optical deflector at each one of the frequencies. The use of energy time for the point for optimising the equalisation of the system is optional.

Once the equalisation of the bandwidth or the mixed equalisation has been carried out, the system is ready to operate, in which case the energy time for the point depending on the speed of the belt, that is read by the device 18, and on the energy of the laser needed to mark or perforate.

It must be taken into account that the speed of the production line may undergo fluctuations, therefore, depending on the speed, the energy needed to mark or perforate shall be different, so the control and coding circuit 12 changes the energy time for the point depending on the speed of the belt, in such a way that the quality of the marking or perforation is protected so that is less dependent on the changes in the speed of the production line. For example, a reduction in the speed would mean an increase in the energy time for the point. Therefore an increase in the energy available per point and a result excessive marking. The control of the energy for the point determines the maximum energy available per point by means of the limitation of the exposure time.

Therefore, this system, according to the invention, maintains a constant energy for marking or perforation regardless of the speed changes in the whole bandwidth of the acoustic-optical deflector 16.

The criterion for selecting the energy for marking or perforation is based on the observation of the marking by an operator or by automatic means for which the control and coding centre 12 is informed by asking it for a more or less energy for marking or perforation that the control centre controls by attenuating and/or amplifying the RF signal and/or controling the energy time for the point.

It should be stated that the control and coding unit 12 can generate a signal for activating and deactivating the laser with each one of the digital values obtained for each one of the points in the matrix that determines the character, anagram, etc., to be marked or perforated.

In practice, this system provides marking with messages with alphanumerical characters, serial numbers, time and date of manufacture, sequence coding, logotypes etc., with various heights and widths at a speed of up to 2,000 metres per minute and over 10,000 characters per second.

Figure 2:
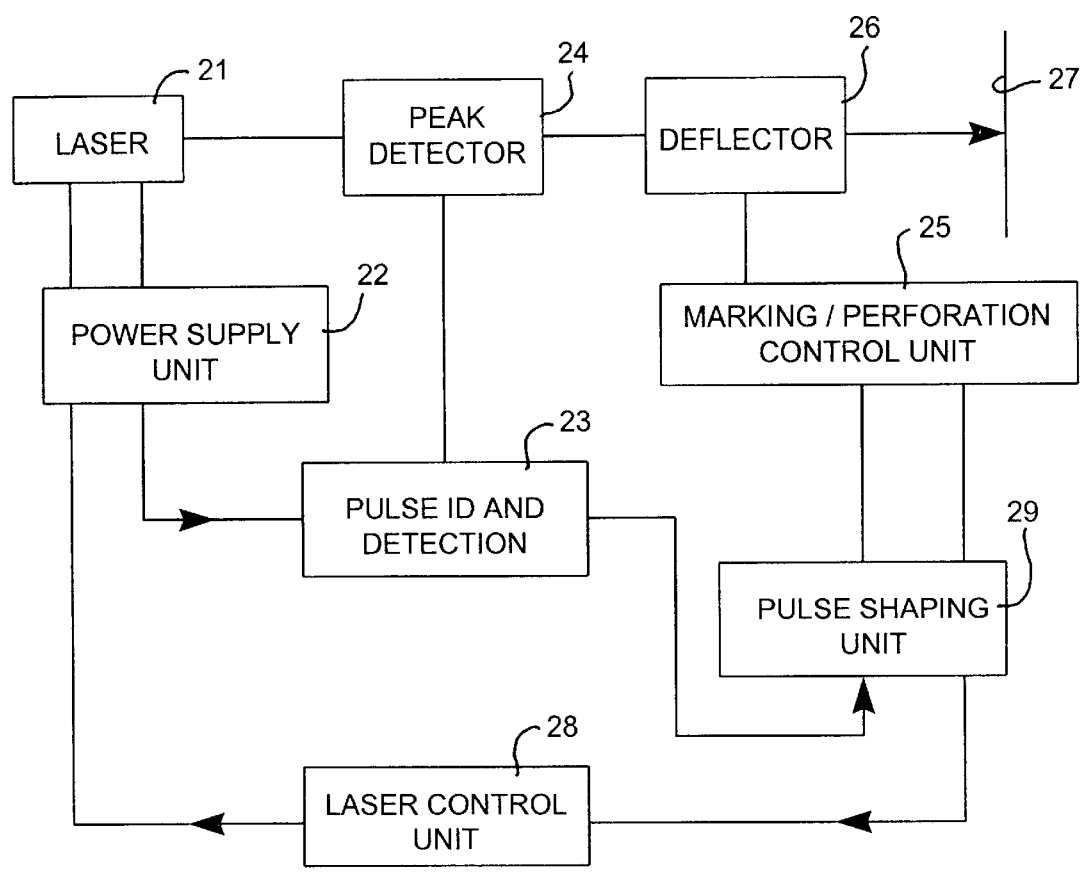
FIG. 2 shows a functional block diagram of a second embodiment of the system according to the invention.
Figure 3:
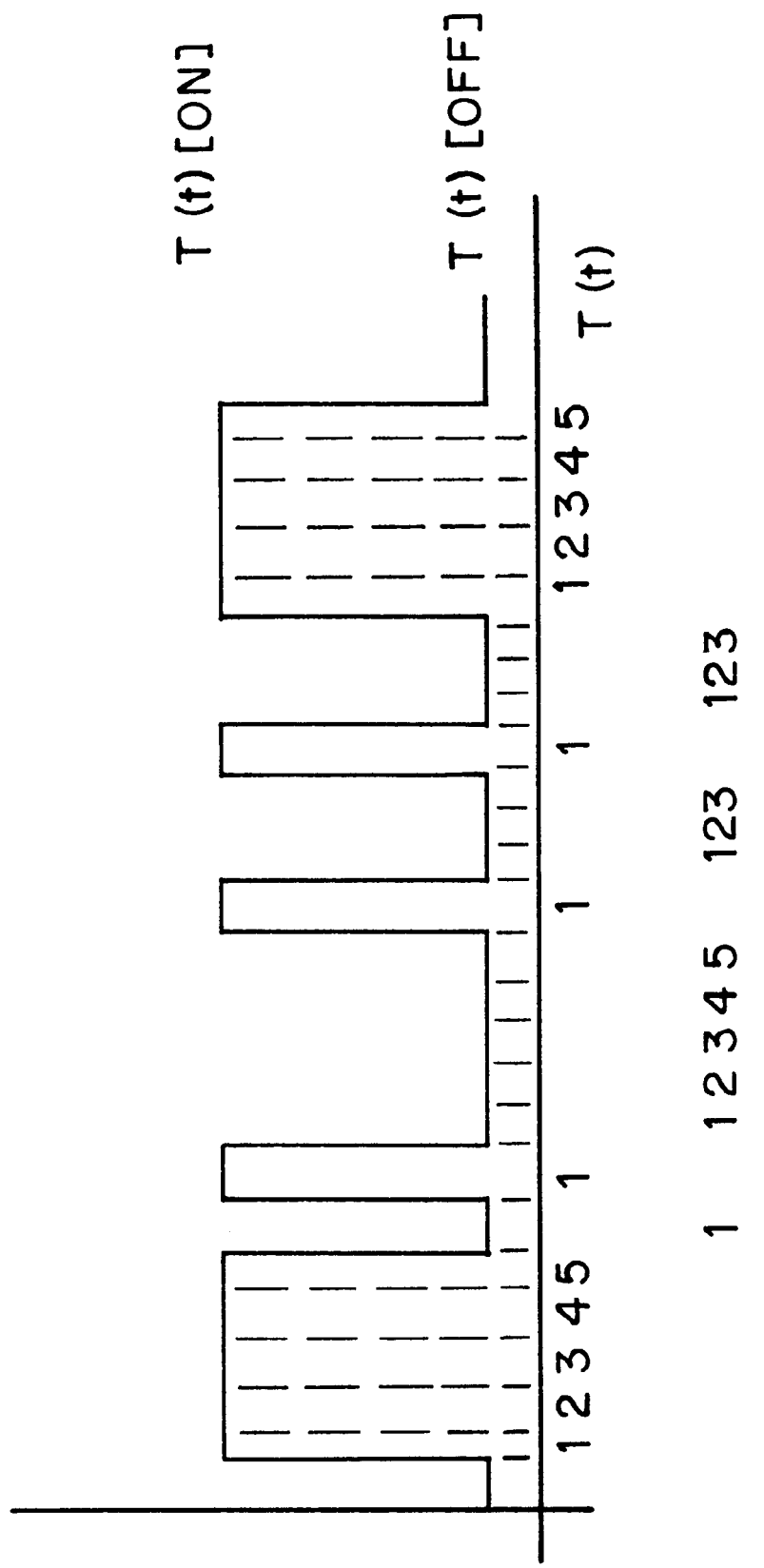
FIG. 3 shows an example of a function T(t) produced by a pulse shaping unit for producing the letter M in the system according to FIG. 2.

1.2 FIGS. 2 and 3

This example of a system, according to the invention, incorporates a laser 21 that works in the pulsed mode, a pulse identification and detection unit 23, 24 that incorporates a peak detector 24 connected to the power supply unit 22 for the laser 21, in such a way that when the laser is activated, it detects, during the generation of the pulse, the moment in which the maximum power peak occurs, confirming the pulse.

Furthermore, it incorporates a marking or perforation control unit 25 that generates different signals that are applied to a deflector 26 in order to mark or perforate a point, at the same time that the power peak occurs in order to mark or perforate multiple consecutive points of the matrix, in the moment in which the peak of power occurs, which depends on the character to be marked or perforated.

It also incorporates a pulse shaping unit 29 that generates a sequence of variable pulses, that is a function of the character to be marked or perforated, in order to keep the laser 21 activated when a point or a set of continuous points have to be marked or perforated within the matrix that makes up the character, and switch off the laser 21 when there is no point or set of points to be marked or perforated that makes up the matrix of the character, providing that the maximum time for switching on the laser is not exceeded and the minimum time for deactivating the laser 21 is exceeded in order to keep the output power within the maxinum power peaks.

The pulse identification and detection unit 23, 24 has a cell for reading the power, response time less than the time of activating the laser point, thereby determining the value of the power in real time.

The pulse identification and detection unit 23 is equipped with the means for controlling (control program) the power of the laser, increasing it or reducing it in order to obtain the proper level of energy for each one of the points to be marked or to be perforated.

Furthermore, the pulse identification and detection unit 23 is equipped with the means for the detection of the minimum power beneath which no marking or perforation on the surface 27 of the product is performed, in order to change the working of the system when this situation arises.

A control unit 28 for the laser acts according to the sequence of pulses generated in the pulse shaping unit, for generating signals for activating and deactivating the laser with each character to be marked or perforated.

The pulse shaping unit 29 is equipped with the means (control program) for detecting, based on the signals provided by the pulse identification and detection unit 23, when the laser functions outside of the maximum time of activation and of the minimum time for deactivating the laser, for keeping the output power within the power maximum, in which case it looks for a new format, type of character, or size of character, that will allow it to work within the time limits.

The pulse shaping unit 29 is made up by an intelligent pulse generator with a general control and mathematical processing internal program. The power supply source 22 of the laser 21 is connected to a pulse identification and detection unit 23 that in turn is connected to a control unit for the system of marking or perforation 25.

The pulse identification and detection unit 23 has a peak detector connected 24.

On the other hand, the pulse identification and detection unit 23 is connected to the pulse shaping unit 29 that is connected to the power supply source 22 through a control unit for the laser generator 28, and that is also connected to the control unit of the system of marking or perforation 25.

The marking or perforation control unit 25 is connected to the acoustic-optical deflector 26 to which it applies the different frequencies that produce the deflection of the laser beam coinciding with the area to be marked 27 on the corresponding product according to a matrix n×m, based on which the character to be marked or perforated is formed, as was described earlier.

In the example for doing so, an acoustic-optical deflector has been used, but any other means my be used that allows the deflection of the laser beam, as for example an electro-optical deflector, mobile mirrors, holographic diffraction networks, controlled wave guides, etc.

The system has a set of character generators with different resolutions, which are selected with the proper resolution in case the working cannot be kept within the established time limits, in order to maintain the mathematical ratios between the energy needed for carrying out the marking or perforation of a point and the maximum peak power of the pulsed laser.

In order to carry out the marking or perforation of a moving product with a laser, the minimum energy that is capable of eliminating or volatilising a surface layer of the product to be marked or perforated is used. The energy factor is an essential characteristic for obtaining a good definition for the marking or perforation.

The value of the energy E is directly related to the time, T, and the power, P, according to the following formula:

$$E=P \times T$$

Therefore, in order to achieve a high energy level, high power is used in a short time or low power over a very long time.

The application of a high powered laser pulse for a moment of time allows a greater energy absorption by the materials to be marked, than with an amount of continuous power equivalent to the average laser power for a longer period of time, in spite of the fact that in both cases the energy used is the same. This is due to the fact that as from a certain power threshold the material drastically increases its capacity for absorbing energy. This effect is due to the appearance of "plasma", which is a phase for matter in which the material loses its characteristics as such and thereby changes its physical characteristics (reflection, absorption and transmission of energy).

In an average power laser Po, working without energy optimisation, according to the previous formula anterior, the following shall be obtained:

$$E=Po \times tp$$

With tp being the energy time for the point that is the time during which the laser is in line with an area corresponding to the point.

When doing this with energy optimisation, the time for the point tpt is a random function that is generated from the knowledge about the characters, logotypes or any set of points and the energy needed for the marking or perforation.

In a pulse generating laser, the functioning is defined by a time T of the pulse cycle, where:

$$T=t1+t2$$

With t1 being the time the laser is activated and t2 being the time the laser is switched off.

A maximum energy performance may be obtained, but it is necessary to respect the previous equation, and for this purpose the invention has a pulse shaping circuit 29, as shall be described later.

The pulse power is greater than the average power of the laser by a factor K and the energy during the period, T, shall be:

$$E=K \times Po(t) \times (t1+t2)$$

where
    $Po(t)=Po$  $0<t<t1$
    $Po(t)=0$  $t1<t<t2$

Since t2 is the time the laser is off, Po is 0 in this period, in such a way that if t1 is equal to tpt, the previous equation remains as follows:

$$E=K \times Po \times tpt$$

Since the factor K is greater than 1, an increase in the energy for the point is produced.

The pulse identification and detection unit performs the recognition and identification of the power peaks generated by the laser resonator and thereby obtains a signal of reference for adapting the system and activating the process at the time in which the instantaneous power of the laser is the optimum one, therefore the pulse detection circuit is formed by a cell for reading the power with the response time of less than t1, and that does not take into consideration the time of the laser 21 in the time during which it is switched off t2, whereby precise knowledge is gained about the value of the power in real time finding the duration and the moment in which the power peak occurs making maximum use of the energy supplied to the laser 21 to mark or perforate the surface 27.

Obtaining the pulse identification signal also allows the state of the laser 21 to be known and to proceed consequently depending on the power level.

So, if the power level is low, the current of the power source for the laser increases, whereas if the power level is high, the current of the power source for the laser falls.

Moreover, if the power level falls below a set minimum it allows the modification of the working of the system, thereby preventing from working under unsuitable conditions.

On the other hand, the pulse identification and detection unit 23 recognises the signals from the power source 22 by collecting and forming a permanent control signal for the laser generator. Therefore the first pulse identification and detection unit detects and controls the state of the power supply source 22 as well as the power generated in the laser 21, parameters that allow the working of the system to be adjusted in order to achieve optimum marking or perforation.

The pulse shaping unit 29 generates a signal T(t), that depends on the character, logotype set of points that may wish to be marked.

As has already been described, using a matrix, for example of the type P (n, m) where n shall be the points in the direction perpendicular to the belt for marking or perforation and m being the points in the direction of the belt.

The values of the matrix of points shall be defined according to the following criterion:

P(n, m)=0 point deactivated

P(n, m)=1 point activated

If the point time is tpt, that is the time during which the area of a point on the surface is in position or is exposed, the minimum time in which the laser is deactivated is t2 and the maximum time for the laser to be activated is t1, the pulse shaping unit obtains a sequence of pulses that are a function of tpt, or multiples thereof, that will be the ones that control the power supply source 22 for the laser.

The mathematical equation corresponding to T(t) is:

$$T(t)(on)+T(t)(off)$$

$$T(t)(on)=Kr \times tpt; Kr=1 \ldots r$$

with r=t1/tpt $$T(t)(off)=Ks \times tpt; Ks=1 \ldots s$$

With s=t2/tpt

The values for Ks and Kr se are obtained according to the values of the matrix P (n, m). For a better understanding of that stated, the following practical example is illustrated.

If we want to generate the function T(t) for a set of points defined in the following way:

|   | 1 | 2 | 3 | 4 | 5 |
|---|---|---|---|---|---|
| 1 | * |   |   |   | * |
| 2 | * | * |   | * | * |
| 3 | * |   | * |   | * |
| 4 | * |   |   |   | * |
| 5 | * |   |   |   | * |

The values for the matrix P (n,m) shall be;

| | | | | |
|---|---|---|---|---|
| P(1,1) = 1 | P(1,2) = 0 | P(1,3) = 0 | P(1,4) = 0 | P(1,5) = 1 |
| P(2,1) = 1 | P(2,2) = 1 | P(2,3) = 0 | P(2,4) = 1 | P(2,5) = 1 |
| P(3,1) = 1 | P(3,2) = 0 | P(3.3) = 1 | P(3,4) = 0 | P(3,5) = 1 |
| P(4,1) = 1 | P(4,2) = 0 | P(4,3) = 0 | P(4.4) = 0 | P(4,5) = 1 |
| P(5,1) = 1 | P(5,2) = 0 | P(5,3) = 0 | P(5,4) = 0 | P(5,5) = 1 |

The function T(t) is given by the pulse train shown in FIG. 3.

It is important to take into consideration, when the time T(t) (on) is over at1 or T(t)(off) is less than t2, or that both circumstances arise at the same time, an non-viable technical solution is produced in which case the pulse shaping unit reconfigures the code to be marked by modifying the function T(t), so that the following is met:

T(t)(on)<=t1 and

T(t)(off)>=t2 (equation A).

The changes in the function T(t) (on), T(t) (off) or both may be carried out by modifying the initial conditions for defining the set of points that configure the marking or perforation. The modifications may be made in the following ways:

1. Looking for a new format or type of character that allows equation A to be met, without modifying the message that is intended to be given;
2. Changing the size of the character, since the size of the character is directly related to the time tpt and t1 and t2 being fixed, a reduction in the time tpt may allow equation A to be fulfilled; and
3. By changing the general definition of the code whereby the invention will be equipped with a set of generators with a different resolution, that will have been validated beforehand and access shall be given to them for being able to use them should equation A not be complied at points 1 and 2; they are selected in accordance with the appropriate resolution so that equation A will be fulfilled.

The pulse shaping unit 29, when reconfiguring a character, works in real time by carrying out a prior scan of the set of points to be marked and making the appropriate modifications where necessary.

In order to perform the reconfiguration, the pulse shaping unit is equipped with an intelligent pulse generator with a general internal control and mathematical processing program.

On its side, the control unit for the marking or perforation system 25 receives the signals obtained from the pulse identification and detection unit 23 processing them to obtain the suitable character, taking into account the speed of the product, the type of character. the size and all the parameters that make up a given coding.

The control unit for the marking or perforation system 25 is identical to that which is used in the dynamic marking or perforation system with the sole consideration that it has a structure adapted for the pulse identification and detection unit 23, and its output is connected to the pulse shaping unit 29, since it may, according to some previous instructions, change the size of the character or the format of the character or use a lower resolution for marking or perforation so that equation A is fulfilled, as was mentioned earlier.

Therefore, the control unit for the marking or perforation system 25 processes the signals and based on them, it tells the pulse shaping unit 29 whether the programming performed therein allows for optimum marking or perforation or not, forcing it to change the parameters mentioned earlier should the marking or the perforation not be optimum.

The control unit for the laser generator 28 is the control circuit for the power supply source 22, that prepares a routine of parameters for working, defined according to the conditions for marking or perforation.

The control unit for the laser generator works with the pulse T(t) received from the pulse shaping unit so that the laser will function within the interval stated in equation A.

This structure, as described, allows that each time that the presence is detected for a product to be marked or perforated as, for example, may be performed using a photoelectric cell, the system functioning in the way mentioned is active.

This system, according to the invention, may function by marking a single point at the precise moment at which the power peak occurs or by carrying out the marking of a whole group of points, such as a complete character during the laser pulse, although in this case the maximum energy is not taken advantage of for marking or perforating the points, but the optimisation of the use of energy is obtained for its application in the marking or perforation of the character. The latter state would be more appropriate for high speed belts.

Therefore, the control unit for the marking or perforation system 25 may generate different frequencies or a single frequency during a pulse generated by the laser, i.e., it will generate a frequency for each one of the pulses contained in the function T(t), that is to say that the pulse of the laser is kept active during the function T(t), on the contrary it follows the same frequency, but all of it providing that equation A, as already mentioned, is met.

In the event of using another type of deflector, the control unit for the marking or perforation system generates different signals or a single signal during a pulse generated by laser, in the same way described for the acoustic-optical deflector.

1.3 FIG. 4.

Figure 4:
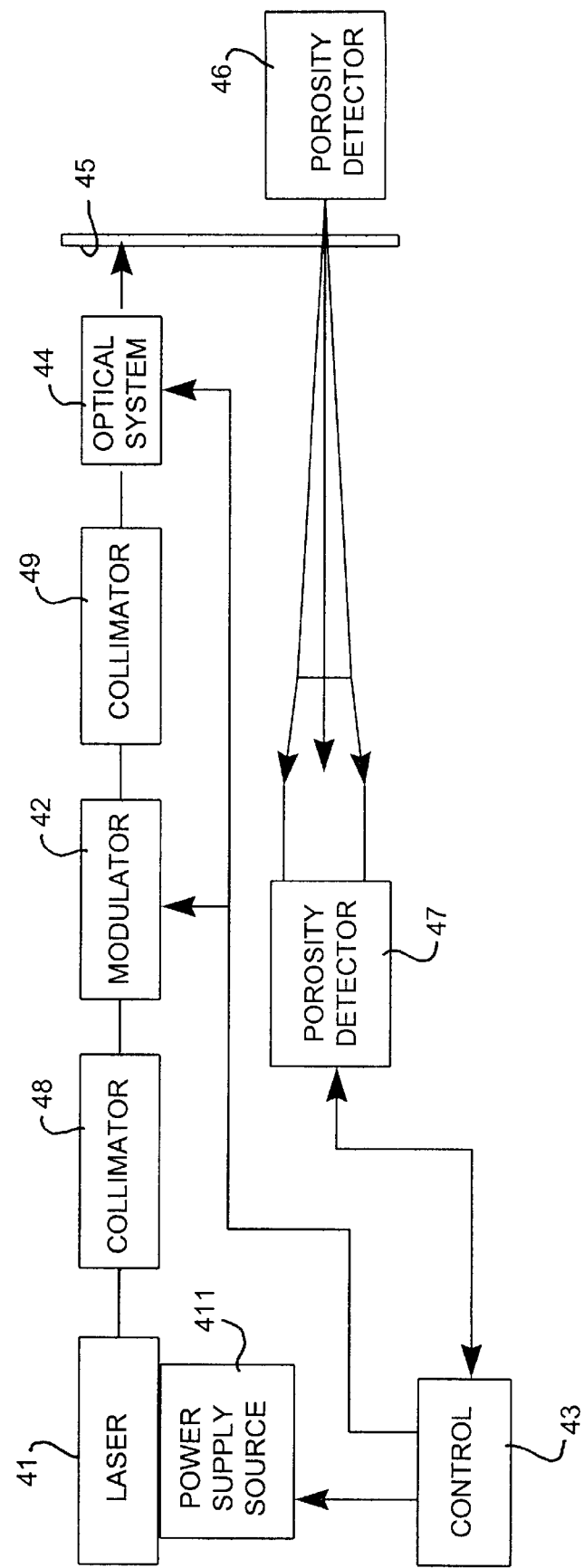
FIG. 4 shows a functional block diagram of a third embodiment of the system according to the invention.

This example of the laser marking and perforation system according to the invention illustrated in FIG. 4 incorporates a laser 41 or a number of lasers, preferably with several resonators. The laser produces at least one beam. The system also incorporates a power supply unit 411 for the laser 41 or the lasers, a unit or means of control 43 with a control program that controls the continuous or pulsed working of the laser 41 and a modulator 42, in particular an acoustic-optical deflector that produces different angles of deflection of the beam.

This system, according to the invention, also incorporates an optical system 44 for which the beam passes through that produces orifices according to a matrix of points (for example n×m) on a surface 45 of a moving product.

The system may also be made up by a single laser with a number of resonators, in such a way that each resonator can be controlled independently by the control means 43 for creating the set of n×m points that configure a code, character, logotype and/or text to be marked or to be perforated. The power supply unit 411 which supplies energy to the laser, the modulator 42 and the optical system 44 that may be controlled by the control means 43. The control means 43 is connected to a device 46,47 that determines the porosity of the surface 45 of the product and that generates information that identifies the porosity and/or the thickness of the product to be marked or to be perforated.

As shall be described later, the control program controls the power supply unit 411, the modulator 42 and the optical system 44 on the basis of information that is pre-established and/or dependent of the information that identifies the thickness and/or porosity of the product to be marked or to be perforated. The control program relates values of power for the laser to values of diameter of points or orifices made on the surface of the product. The program also relates values of time for application of the deflected laser beam to values of diameter of the points or orifices produced on the surface 45 of the moving product.

The system, according to the invention, uses the laser 41 whose beam is applied on the acoustic-optical deflector 42, in order to produce different angles of deflection of the laser beam, which after passing through the optical system that may be a set of lenses 44, marks or perforates the surface 45 of the moving product at different points depending on the angle of deflection provided by the acoustic-optical deflector 42.

The different deflection angles are controlled by the control means 43 using the control program, therefore this control means generates a RF signal whose value of frequency determines the deflection angle for the laser beam.

The acoustic-optical deflector 42 may be determined by any other type of modulator that is controlled by the control unit 43 with the parameters that it requires.

At least the position of one of the lenses of the set of lenses 44 is controlled by the control unit 43 in order to change the focus distance, as shall be described later.

Carrying out the focusing of a laser beam on the surface of a material 45 with high energy, allows a small area of its surface to be volatised and a hole to be obtained defined by:

Diameter of the optical point for focusing the laser;

The absorption of energy of material at the laser wave length, which are the concepts to be taken into account by the marking or perforation system, according to the invention.

The absorption of the laser energy by the material, as has already been described, is a function of the power level of the applied laser. In order to perform the perforation a minimum power value is necessary that is called the power threshold, when exceeding level, the increase in power produces an uncontrolled increase in the diameter of the orifice. This increase is practically formulated and recorded in the control unit 43. According to the invention, these different levels of power are directly related to different diameters of orifices.

As regards the diameter of the point focal this is obtained from the equation:

$$rf=((2 \times L)/Pl) \times F/d.$$

with rf being the radius of the focal point, the wavelength of the laser L, F the distance from the resulting optical set and d is the diameter of laser beam.

In relation with the parameters that appear in the previous equation the focal distance is subject to variation and in some cases the diameter of the laser to be used.

In order to achieve small hole diameters, the following is necessary, according to what is derived from the above equation:

Large beam diameter;

Small focal distance.

These two conditions define the design of the system of dynamic perforation of products according to the invention. The system, according to the invention, operates with a larger laser beam than in the marking systems and with shorter focal distances (for example the beam diameter is 8 mm and the focal distance is 63.5 mm).

This technical requirement is achieved by incorporating first collimators 49 located between the deflector 42 and the optical system 44. The collimators 49 amplify the laser beam at the output from the deflector or modulator 42. A second collimator 48 located between the laser 41 and the modulator 42 reduces the diameter of the laser beam so that it may be deflected by the acoustic-optical deflector 42.

As was explained earlier, it is necessary to have small focal distances (for example, 50 mm) which implies that the marked points or the orifices are laid out closer together and since in some applications the layout of points is required to be more separated, it is included amongst the first collimators 49 and the optical system 44 an angle amplifier (not shown in FIG. 4) that performs the separation between said points.

This system according to the invention, carries out of the porosity control in real time, for which purpose it has a unit 46, 47 that determines the porosity and/or the thickness of the surface 45 of the product and that generates information that identifies the porosity and/or the thickness. This means 46, 47 is made up by a porosity and/or thickness scanner 47 and a light source 46. The porosity and/or thickness scanner 47 generates the aforementioned information that allows the control means 43 to automatically modify the set of parameters for modifying the porosity.

The reading unit 47 for porosity and/or thickness is an optical device that analyses the amount of light that passes through the paper, for which purpose the porosity and/or of thickness detector 47 is located on one side of the surface 45 to be perforated and on the other a light source is arranged 46, that, in the example for carrying this out, is a white light source.

Hence the light emitted by the source 46 passes through the surface 45 whereby the amount of light received by the porosity and/or thickness detector 47 is proportional to the porosity and/or the thickness of the surface 45. This information, when properly processed by the control unit 43 generates signals that modify the parameters needed to obtain the scheduled porosity.

The porosity is defined by the following factors:

Diameter of the orifice.

Number of orifices per cm2

The control unit 43 with the control program in order to achieve a servo-controlled processing of the porosity, according to the invention, acts on each one of these factors in the following way:

In the case of the orifice diameter, the way to automatically control its diameter is feasible by means of two specific possibilities that are used, according to the speed of change in real time.

The first possibility for control consists of carrying out the increase and/or reduction in the power depending on the size of the orifice wanted, this control has a very high response time and defines a maximum diameter and a minimum diameter.

The minimum diameter is defined by the minimum value of the power needed for volatilising the material, that is directly related to the absorption of energy of the material and the power threshold. That is to say, it is the minimum value of power in order to make an orifice in a given material.

The second possibility of carrying out the control consists of introducing a change in the focal distance in the optical system 44 (in particular the set of lenses 44) with a mobile optical system.

In a mobile optical system the control is achieved using the control unit, for which purpose it includes means that let the size be selected for the character to be printed by enlarging it or making it smaller, according to the equation H=L/L2 where H represents the parameter for reduction, L the distance between the extreme beams at the output from the means for selecting the size and L2 is the distance between the extreme beams at the output from the output lens or lenses that form part of a system of lenses.

Furthermore, the means for selecting the size of the character to be printed (marked) have a set of lenses and means for moving one of these lenses in the direction of the axis of the resonator beams, these means being driven by a motor that when it is activated moves the lens over a rail in such a way that the lens may be moved in the positive or negative sense with respect to the plane that produces an amplifying or reducing effect on the character to be marked or perforated.

This motor may be controlled by a control circuit or the control means with the control program that lets the size of the character be selected automatically.

The automatic control circuit for selecting the size of the character may be installed in the same means that process the information that belong to the system control electronics.

With respect to the number of holes per cm2 or density of points in a dynamic perforation system it is feasible to achieve it with the automatic modification of the total number of points defined on a surface in the direction perpendicular to the production line (Y) and in the same direction that of the production line (X).

The maximum number of points is defined with the following ratio:

n=X MAX/dX m=Y MAX/dY, MP=n×m.

with n being the number of orifices in the direction X, dX the separation between vertical lines in the direction X, X MAX is the width of the maximum area of porosity defined in the direction of the product to be marked, m is the number of orifices in the direction Y, dY is the separation between points in the direction Y and Y MAX is the height of the maximum area of porosity defined in the direction perpendicular to the product to be marked.

The parameter MP defines the porosity obtained and the control unit changes the values m and n according to the value that has been defined for the production.

This system of dynamic perforation of a unit for generating points in a digital form as described, allows optimum random control to be carried out for m×n points in an exact way from the control unit.

The fact of having the option of to be able to define the number of orifices in the directions X and Y, allows it to be feasible to do coding, that is to say, being able to work a with matrix of the n×m type, providing the possibility of coded perforation widely used in financial documents, legal tender, cheque books, passports etc.

In the event of using a number of beams generated using initially different resonators included in a laser, higher perforation speeds and greater power saving are achieved.

This system, according to the invention, carries out dynamic equalisation of energy of point based on a new concept that consists of using the exposure time of a point to the laser beam as an of equalisation system.

This concept of equalisation, according to the invention, is backed by the fast response speed that the acoustic-optical deflector device has 42, which is given by the basic factors which are the laser beam diameter which is desired to be deflected and the speed at which the sound wave moves in the deflector means, in the case that is being dealt with here, this speed, when working with small beam diameters and high sound speed, it gives a very short deflection time (for example, less than 500 ns).

Therefore, the system of the invention carries out the equalisation on the basis of making a recording of the efficiency in the response band of the acoustic-optical deflector 42 and without modifying the RF power that is introduced onto the deflector 42, to change, depending on the data recorded beforehand, the time needed so that the energy that is being introduced onto each one of the points of the earlier mentioned matrix will have the same value, i.e., in this matrix not tall the points will have the same duration, but if the set of points that form a vertical line without ever exceeding the maximum time for the said vertical line and this time shall be a function of the speed of travel for the product to be marked and of the scheduled width.

For a better understanding of this concept for equalisation, according to the invention, a practical example of its application will be described.

The optical deflector 42 is capable of generating n angles defined by a set of n different frequencies.

For each one of the n frequencies a given value of efficiency corresponds thereto, defined as a set of values $G_1, G_2, \ldots G_n$, with $0 < G_1 \leq 1$.

The values of the laser power at the output from the optical deflection system 42 are:

$P_1 = G_1 \cdot P$ $P_2 = G_2 \cdot P$ $P_n = G_n \cdot P$

With P being the laser power 41 at the optical deflector input 42 and $G_i$ the efficiency of the deflector 42 or the input i. For a point energy time tp, the laser energy values are:

$E_1 = G_1 \times P \times tp$ $E_2 = G_2 \times P \times tp$ $E_n = G_n \times P \times tp$ (equation 1)

In order to equal the energy values $E_1, E_2, \ldots E_n$, the parameter tp may be controlled, so it shall be necessary to formulate the system in such a way that a different time tpi is obtained for each point, but still maintaining the total time for the vertical line, t1.

$E_i = G_i \times P \times tpi \quad i = 1 \ldots n$ $\sum_{i=1} t_i = n \times tp$ t1 = sum of 1 to n in $tpi = n \times tpt$ With the result that:

$E = E_i$ for any $i(1 \ldots n)$

The time for point tpt is determined by the speed of the product and the type of character to be marked and they are related to the energy time for the point tpi by a variable factor ki corresponding to the time correction in each frequency:

$tpi = ki \times tpt$ (equation 2).

In equation 1, by replacing the time values from equation 2, we shall have:

$E_0 = G_1 \times P \times k_0 \times tpt$ $E_1 = G_2 \times P \times k_1 \times tpt$ $E_n = G_n \times P \times k_n \times tpt$ So that all laser energy values will be equal to a maximum value E MAX, energy achieved at the frequency that with greatest performance G MAX of the deflector, the values of kl may be obtained in the following way;

$E_0 = E_2 = \ldots E_n = EMAX$

En E MAXtp=tpt

By equalling expressions, it will show that:

$GMAX \times P \times tp = G_i \times P \times k_i \times tpt$

When it is found that:

$k_i = G\ MAX / G_i$

And consequently the energy time for the point shall remain as:

$tpi = (G\ MAX / G_i)\ tpt$

With all these time values it will be found that all the n points have the same energy for a defined point time tpt.

The product that is being subjected to this controlled energy, since it is the peak density of the highest energy, the possibility of marking or perforation shall also be greater. This allows an increase in the marking or perforation rate and an extension of the range of products on which the systems mark or perforate that incorporate this new system of dynamic equalisation for the acoustic-optical deflector 42.

2. Other Aspects of the Invention 2.1 Procedure and Product According to the Invention The invention also refers to a procedure for marking or for perforation by laser using the system described, that is to say, by means of a system that is made up by at least one laser, which produces a beam, a power supply unit for at least one laser, a control means with a control program that controls at least one laser, a deflector, in particular a specific acoustic-optical deflector that produces different angles of deflexion for the beam, an optical system through which at least one beam passes that produces a marking or perforation or a perforation in the form of a matrix of points (n×m) on a surface of a product in relative movement between the product to be marked or to be perforated and the laser beam In the procedure, according to the invention, the control program controls the power supply unit and/or the deflector. A frequency generating unit produces signals of a given frequency that is applied to the deflector.

The control means or control centre generates a digital code for each point in the matrix and controls an amplifier and/or an attenuator. Also the control means or centre means generates a sequence of digital signals that produce a frequency sweep that corresponds to the bandwidth of the deflector.

Furthermore, the control means or centre meansobtains the characteristic curve for the response of the deflector in its working bandwidth and controls the amplifier and/or the attenuator on the basis of the characteristic curve of the response for the deflector, and equalises the response of the bandwidth in particular in all the working bandwidth for the modulator, correcting the lack of linearity of the laser power deflected against the bandwidth of the signals with different frequencies applied thereto.

In particular, the control means changes the equalisation by means of the point time: it performs a mixed equalisation by changing the time the laser coincides during the point time and changing the laser power deflected with different frequencies applied to the deflector.

The control means determines which is the optimum working area for the deflector, according to the characteristic curve stored in the deflector and a message to be marked or perforated.

The invention also refers to a procedure that is characterised in that when the laser is switched on, a pulse identification and detection unit (23, 24, FIG. 2) detects during the generation of the pulse the moment in which the maximum peak occurs confirming the pulse. A marking or perforation control unit /(25) generates different signals that are applied to the deflector (26) for marking or perforating a point in the matrix, at the moment when the maximum power peak is reached, or for marking a number of consecutive points on the matrix during the moment in which the maximum power peak occurs, which depends on the character to be marked or perforated. A pulse shaping unit (29) generates a sequence of variable pulses, that depends on the character to be marked or perforated, for keeping the laser (21) activated when a point or a set of continuous points have to be marked within the matrix that make up the character, and deactivate the laser (21) when no point or set of points have to be marked that make up the matrix of the character, provided that the maximum time for activating the laser is not exceeded and that it is not less than the minimum time for deactivating the laser (21) in order to keep the output power within the maximum power peaks.

The pulse shaping unit (29) detects, using the signals provided by the pulse identification and detection unit (23, 24), when the laser is functioning outside of the maximum time for activation and outside the minimum time for deactivating the laser in order to keep the output power within the peaks, in which case it looks for a new format, type of character, or size of character, that will allow it to work within the time limits.

In an example for carrying out the procedure according to the invention, a means determines the porosity of the product and/or the thickness of the product to be marked or perforated and that generates information that identifies the porosity and/or the thickness whilst the control program controls the power supply unit for the laser and the deflector on the basis of pre-established information and/or the information that identifies the porosity and/or the thickness of the product.

The control program controls an optical system that allows different focal distances and/or different beam diameters to be obtained in the focusing point on the basis of signals generated by the control means.

Furthermore, the control program relates values of the power for the laser to values of the diameter of points or orifices made on the surface of the product. Also, the control program relates values of time of incidence for the deflected laser beam to values of diameter for the points or orifices on the surface of the product.

The control program controls the time of incidence of the beam deflected onto the surface so that the energy that it is projecting one each one of the points of the matrix (m×n)will have the same value.

The invention also refers to the products marked and perforated by laser according to the procedure described.

2.2 Other technical data

For the dynamic marking or perforation system or perforation, according to the invention, for example, the following configuration is used:

| | | |
|---|---|---|
| 2.2.1 | Nominal power laser: | |
| | 60/100/140 W | |
| 2.2.2 | Power Supply: | |
| | 220 V 50/60 Hz | |
| 2.2.3 | Cooling System: | |
| | Water-cooled closed circuit. | |
| | Cooling power: 1800 W | |
| | Tank capacity: 12 L | |
| | Flow rate: 8 L/Min | |
| | Pressure: 4.4 Kg/cm2 | |

-continued

| | | |
|---|---|---|
| | Water Temperature: 18° C./22° C. | |
| 2.2.4 | Suction system: medium pressure fan built into the system. | |
| 2.2.5 | Laser Tube | |
| | Sealed CO2 laser | |
| | RF Technology | |
| | Wavelength: 10.6 m | |
| | Sizes (LHW): 645 × 150 × 95 mm | |
| 2.2.6 | Printout matrix | |
| | 5 × 5/1, 2 or 3 lines | |
| | 7 × 5/1 or 2 lines | |
| | 12 × 11/1 line | |
| | 18 × 17/1 line | |
| 2.2.7 | Focusing | |
| | 2'5" lens | Focal distance: 63.5 mm |
| | | Focus depth: +/−0.71 mm |
| | | Point diameter: 122.4 micrometres |
| | | Max. Size of Character (18 points): |
| | | 3.7 mm |
| | 5"lens | Focal distance: 127 mm |
| | | Focus depth: +/−1.42 mm |
| | | Point diameter: 244.8 micrometres |
| | | Max. Size of Character (18 points): 6 mm |
| | 10" lens | Focal distance: 254 mm |
| | | Focus depth: +/−2.84 mm |
| | | Point diameter: 487.7 micrometres |
| | | Max. Size of Character (18 points): 12 mm |

In a specific example a sealed CO2 laser is used, with a wave guide, excited by R.F., the RF excitation unit is capable of supplying a power of up to 2,000 W.

The unit 23 is preferably formed by a programmable Logic Device from the firm LATTICE, USA that contains the equations that shall later be used by a 16 bits microprocessor, from the firm of Motorola, model MC-68000.

The detector 24 is a magnetic-electro-optical detector for Hg-Cd-Te from the firm Boston Electronics of Boston, USA.

The control unit (12, 25, 43) which corresponds to a unit 12 (FIG. 1) may also be formed by a 16 bit microprocessor from the firm of Motorola, model MC-68000, a ROM memory that contains the micro code for the control program, a RAM memory for storing the variable data and the necessary input/output peripherals for being able to perform the control of the elements that are dependent on this control such as, for example, units 28, 29, 26, 16, 17, 18 and 19.

Unit 19 is made up by a component of its own design made by "SERVICIO INDUSTRIAL DE MARCAJE Y CODIFICACION, S.A." Barcelona/Spain.

The other elements, for example 14, 15, 29, 44 and 47 are designed and manufactured by the firm "SERVICIO INDUSTRIAL DE MARCAJE Y CODIFICACION, S.A." Barcelona/Spain.

3. List of Reference Numerals 11 information capture unit
12 control and coding centre
13 DDS
14 amplifier and/or attenuator
15 RF amplifier
16 acoustic-optical deflector
17 photocell
18 device
19 frequency generating unit
21 laser unit
22 power supply unit
23 pulse identification and detection unit
24 peak detector
25 marking or perforation control unit 26 deflector
27 surface area to be marked
28 laser control unit
29 pulse shaping unit
41 laser unit
411 power supply source
42 modulator, deflector
43 control means
44 optical system
45 surface area of the product to be marked
46 light source
47 porosity reading unit
48 collimator
49 collimator

What is claimed is:

1. A system for producing marks or perforations on a moving product, the system comprising:
   at least one laser for producing a beam, the beam causing each of the marks or perforations in response to an energy duration at a particular point on the moving product;
   a power unit for providing the laser unit with power for the energy duration in accordance with an energy command signal;
   a frequency generator for producing a first signal having a frequency which corresponds to a frequency command signal identifying which frequency the first signal is to have;
   an amplitude adjusting unit for receiving the first signal and producing a second signal which is an amplitude adjusted version of the first signal in accordance with an amplitude command signal;
   an acousto-optical deflector for producing different deflection angles of the beam in response to the frequencies of the second signal, the acusto-optical deflector producing a non-linear characteristic response curve over its operating frequency bandwidth;
   a storage unit for receiving and storing the characteristic response curve of the acousto-optical deflector; and
   a control unit having a control program for producing the energy command signal, the frequency command signal, and the amplitude command signal, the control unit: (i) causing the first signal to sweep through frequencies corresponding to the operating frequency bandwidth of the acousto-optical deflector such that the acousto-optical deflector produces the non-linear characteristic response curve; and (ii) performing equalization by adjusting the amplitude command signal to correct for the non-linear characteristic response curve at least over a portion of the operating frequency bandwidth of the acousto-optical deflector.

2. The system for producing marks or perforations on a moving product of claim 1, further comprising:
   a message which comprises an n×m matrix of data points, each data point corresponding to a particular mark or perforation to be disposed on the moving product,
   the control unit producing at least one of the energy command signal, the frequency command signal, and the amplitude command signal in response to the data points in the n×m matrix.

3. The system for producing marks or perforations on a moving product of claim 2, the control unit for performing point-by-point equalization of the non-linear response of the acusto-optical deflector by varying the amplitude of the second signal corresponding to at least some of the data points of the n×m matrix.

4. The system for producing marks or perforations on a moving product of claim 2, wherein the control unit performs point-by-point equalization of the non-linear response of the acousto-optical deflector by varying the energy duration corresponding to at least some of the data points of the n×m matrix.

5. The system for producing marks or perforations on a moving product of claim 2, wherein:
   the laser is operated in a pulse mode where the beam is pulsed and the control unit causes at least one data point of the message in the n×m matrix to be disposed on the moving product when the beam has a maximum power peak,
   the system further comprising:
   a pulse identifying and detecting unit having a maximum power peak detector connected to the powering unit, the detecting unit sensing the maximum power peaks of the laser;
   a pulse-shaping unit being coupled to the control unit and the power unit, the pulse-shaping unit for: (i) generating a sequence of variable width pulses, the sequence being a function of the data points of the message; (ii) activating the laser in accordance with the sequence of pulses during activation periods sufficiently long to mark or perforate one or more points on the moving product; and (iii) deactivating the laser in accordance with the sequence of pulses during deactivation periods when no marks or perforations are made,
   the activation periods of the laser not being shorter than the deactivation periods of the laser such that a starting power of the laser is maintained between the maximum power peaks of the laser.

6. The system for producing marks or perforations on a moving product of claim 5, wherein the power peak detector includes a response time which is shorter than the respective activation periods of the laser, the response time determining the peak power of the laser in real time.

7. The system for producing marks or perforations on a moving product of claim 5, wherein the pulse identifying and detecting unit comprises a control element for increasing or decreasing the power of the laser such that its energy level is adequate for disposing each of the marks or perforations on the moving product.

8. The system for producing marks or perforations on a moving product of claim 5, wherein the pulse identifying and detecting unit comprises means for detecting a minimum power of the laser below which the energy of the laser is insufficient for disposing the marks or perforations on the moving product, the means for detecting a minimum power of the laser stopping the system when the power of the laser is below the minimum power.

9. The system for producing marks or perforations on a moving product of claim 5, further comprising a generator control unit for receiving the pulse sequence from the pulse-shaping unit and generating laser activating and deactivating signals in accordance with one or more of the data points of the message.

10. The system for producing marks or perforations on a moving product of claim 9, wherein the generator control unit of the laser controls a pulsing frequency of the laser to define a configuration of the message on the basis of at least one vertical line of consecutive points of the matrix.

11. The system for producing marks or perforations on a moving product of claim 9, wherein the generator control unit of the laser controls the pulsing frequency of the laser to define the configuration of the message on the basis of the points to be produced in the matrix of at least the consecutive points composing a character of the message.

12. The system for producing marks or perforations on a moving product of claim 9, wherein the generator control unit of the laser controls the pulsing frequency of the laser to define the configuration of the message on the basis of at least the consecutive points composing at least a portion of the message.

13. The system for producing marks or perforations on a moving product of claim 5, wherein the pulse-shaping unit includes a detector for receiving signals from the identifying and detecting unit for determining whether the activation period is outside a maximum activation time and the deactivation period is outside a maximum deactivation time, the detector varying at least one of a format, character time, and character size criteria of the message such that the output power may be maintained within the maximum power peaks.

14. The system for producing marks or perforations on a moving product of claim 5, further comprising a group of character generators each having a different character definition capable of being produced within the activation and deactivation times such that an amount of energy and an amount of power needed for producing the marks or perforations on the moving product is obtained.

15. The system for producing marks or perforations on a moving product of claim 2, further comprising:
an information collecting unit connected to the control unit, the information collecting unit comprising a reading unit for interacting with an operator, the information unit receiving a message which the operator wishes to dispose on the moving product and producing the data points of the n×m matrix, where the data points are based on cartesian coordinates.

16. The system for producing marks of perforations on a moving product of claim 15, wherein the interactive reading unit comprises a graphic card having software for facilitating real time memorization of the data points of the message.

17. The system for producing marks or perforations on a moving product of claim 15, wherein the interactive reading unit comprises an optical reader.

18. The system for producing marks or perforations on a moving product of claim 1, wherein the control unit determines an optimum operating zone which corresponds to one of a group of sub-bandwidths of the operating frequency bandwidth of the acousto-optical deflector for acting on the beam, the optimum operating zone being determined as a function of the characteristic response curve.

19. The system for producing marks or perforations on a moving product of claim 18, wherein the control unit determines the optimum operating zone by: (i) determining a bandwidth needed to respond to the data points from the characteristic response curve of the acousto-optical deflector; (ii) calculating efficiency values corresponding to the sub-bandwidths; and (iii) selecting one sub-bandwidth having a maximum efficiency value.

20. The system for producing marks or perforations on a moving product of claim 18, wherein the control unit determines the optimum operating zone by: (i) determining first values corresponding to average efficiency values for respective frequencies of each sub-bandwidth; (ii) determining second values corresponding to variance values between respective maximum efficiency values and minimum efficiency values within each sub-bandwidth; (iii) determining third values corresponding to minimum efficiency values for each sub-bandwidth; and (iii) calculating products of the first, second, and third values with respective pre-determined weighing parameter values to select the optimum operating zone.

21. The system for producing marks or perforations on a moving product of claim 20, wherein the parameter values are selected such that an aggregate of the products of the first, second, and third values and respective pre-determined weighing parameter values is maximum when, for the optimum operating zone, the first value represents a maximum average efficiency, the second value represents a minimum variance, and the third value represents a highest minimum efficiency.

22. The system for producing marks or perforations on a moving product of claim 1, further comprising a determining means for determining at least one of porosity and density characteristics of the moving product and generating an indication thereof for transmitting to the control unit such that the powering unit is controlled in accordance with the information.

23. The system for producing marks or perforations on a moving product of claim 22, wherein data points of a message to be disposed on the moving product are perforations, the determining means comprising a light source for emitting light onto the surface of the moving product and an optical device which receives and analyzes light passing through the product.

24. The system for producing marks or perforations on a moving product of claim 1, wherein the control unit includes a control program operable to adjust the power unit and the acousto-optical deflector in accordance with pre-determined information corresponding to at least one of porosity and density characteristics of the moving product.

25. The system for producing marks or perforations on a moving product of claim 1, further comprising an optical system for modifying the characteristics of the beam as the beam passes therethrough in accordance with an optical command signal from the control unit.

26. The system for producing marks or perforations on a moving product of claim 25, wherein the control unit includes a control program operable to adjust at least one of a focal distance of the beam and a diameter of the beam at a focussing point by providing signals to the optical system.

27. The system for producing marks or perforations on a moving product of claim 25, wherein the optical system further comprises an angular amplifier.

28. The system for producing marks or perforations on a moving product of claim 1, comprising a laser with a purality independently controllable resonators.

29. The system for producing marks or perforations on a moving product of claim 1, comprising a laser without a deflector having a purality independently controllable resonators for producing the marks or perforations directly on the product.

30. The system for producing marks or perforations on a moving product of claim 1, comprising a laser having a plurality of resonators and at least one deflector.

31. A method for producing marks or perforations on a moving product comprising the steps of:
producing a beam using a laser, the beam causing each of the marks or perforations in response to an energy duration at a particular point on the moving product;
providing the laser unit with power from a power unit for producing the energy duration in accordance with an energy command signal;
producing a first signal having a frequency using a frequency generator, the first signal corresponding to a frequency command signal identifying which frequency the first signal is to have;

receiving the first signal and producing a second signal which is an amplitude adjusted version of the first signal in accordance with an amplitude command signal using an amplitude adjusting unit;

producing different deflection angles of the beam in response to the frequencies of the second signal using an acusto-optical deflector which has a non-linear characteristic response curve over its operating frequency bandwidth;

receiving and storing the characteristic response curve of the acousto-optical deflector using a storage unit; and producing the energy command signal, the frequency command signal, and the amplitude command signal using a control unit having a control program, the control unit:

(i) causing the first signal to sweep through frequencies corresponding to the operating frequency bandwidth of the acousto-optical deflector such that the acusto-optical deflector produces the non-linear characteristic response curve; and (ii) performing equalization by adjusting the amplitude command signal to correct for the non-linear characteristic response curve at least over a portion of the operating frequency bandwidth of the acousto-optical deflector.

32. The method for producing marks or perforations on a moving product of claim 31, further comprising the steps of:

producing an n×m matrix of data points, each data point corresponding to a particular mark or perforation to be disposed on the moving product, the control unit producing at least one of the energy command signal, the frequency command signal, and the amplitude command signal in response to the data points in the n×m matrix.

33. The method for producing marks or perforations on a moving product of claim 32, further comprising the step of performing point-by-point equalization of the non-linear response of the acousto-optical deflector by varying the amplitude of the second signal corresponding to at least some of the data points of the n×m matrix.

34. The method for producing marks or perforations on a moving product of claim 32, further comprising the step of performing point-by-point equalization of the non-linear response of the acousto-optical deflector by varying the energy duration corresponding to at least some of the data points of the n×m matrix.

35. The method for producing marks or perforations on a moving product of claim 32, further comprising the step of:

receiving a message for disposing on the moving product using an information collecting unit connected to the control unit; and producing the data points of the n×m matrix based on the received message, where the data points are based on cartesian coordinates.

36. The method for producing marks of perforations on a moving product of claim 35, wherein the information collecting unit comprises a graphic card having software for facilitating real time memorization of the data points of the message.

37. The method for producing marks or perforations on a moving product of claim 32, further comprising the steps of:

operating the laser in a pulse mode where the beam is pulsed;

disposing at least one data point in the n×m matrix on the moving product when the beam has a maximum power peak;

sensing the maximum power peaks of the laser using a pulse identifying and detecting unit having a maximum power peak detector connected to the powering unit;

generating a sequence of variable width pulses, the sequence being a function of the data points of the message using a pulse-shaping unit coupled to the control unit and the power unit;

activating the laser in accordance with the sequence of pulses during activation periods sufficiently long to mark or perforate one or more points on the moving product;

deactivating the laser in accordance with the sequence of pulses during deactivation periods when no marks or perforations are made; and maintaining a starting power of the laser between the maximum power peaks of the laser by insuring that the activation periods of the laser are not shorter than the deactivation periods of the laser.

38. The method for producing marks or perforations on a moving product of claim 37, wherein the power peak detector includes a response time which is shorter than the respective activation periods of the laser, the response time determining the peak power of the laser in real time.

39. The method for producing marks or perforations on a moving product of claim 37, further comprising the steps of:

receiving the pulse sequence from the pulse-shaping unit; and generating laser activating and deactivating signals in accordance with one or more of the data points.

40. The method for producing marks or perforations on a moving product of claim 37, further comprising the steps of:

receiving signals from the identifying and detecting unit;

determining whether the activation period is outside a maximum activation time;

determining whether the deactivation period is outside a maximum deactivation time; and varying at least one of a format, character time, and character size criteria of a message in the n×m matrix, when the activation period is outside a maximum activation time and the deactivation period is outside a maximum deactivation time, such that the output power may be maintained within the maximum power peaks.

41. The method for producing marks or perforations on a moving product of claim 31, further comprising the step of determining an optimum operating zone which corresponds to one of a group of sub-bandwidths of the operating frequency bandwidth of the acousto-optical deflector for acting on the beam, the optimum operating zone being determined as a function of the characteristic response curve.

42. The method for producing marks or perforations on a moving product of claim 41, further comprising the steps of:

determining a bandwidth needed to respond to the data points from the characteristic response curve of the acousto-optical deflector;

calculating efficiency values corresponding to the sub-bandwidths;

selecting one sub-bandwidth having a maximum efficiency value;

determining first values corresponding to average efficiency values for respective frequencies of each sub-bandwidth;

determining second values corresponding to variance values between respective maximum efficiency values and minimum efficiency values within each sub-bandwidth;

determining third values corresponding to minimum efficiency values for each sub-bandwidth; and calculating products of the first, second, and third values with respective pre-determined weighing parameter values to select the optimum operating zone.

43. The method for producing marks or perforations on a moving product of claim 42, wherein the parameter values are selected such that an aggregate of the products of the first, second, and third values and respective pre-determined weighing parameter values is maximum when, for the optimum operating zone, the first value represents a maximum average efficiency, the second value represents a minimum variance, and the third value represents a highest minimum efficiency.

44. The method for producing marks or perforations on a moving product of claim 31, further comprising the step of increasing or decreasing the power of the laser using an identifying and detecting unit comprising a control element such that its energy level is adequate for disposing each of the marks or perforations on the moving product.

45. The method for producing marks or perforations on a moving product of claim 31, further comprising the steps of:

detecting a minimum power of the laser below which the energy of the laser is insufficient for disposing the marks or perforations on the moving product; and stopping the system when there the power of the laser is below the minimum power.

46. The method for producing marks or perforations on a moving product of claim 31, further comprising the step of obtaining an amount of energy and an amount of power needed for producing the marks or perforations on the moving product using a group of character generators each having a different character definition capable of being produced within the activation and deactivation times.

47. The method for producing marks or perforations on a moving product of claim 31, further comprising the step of modifying the characteristics of the beam using an optical system as the beam passes therethrough in accordance with an optical command signal from the control unit.

48. The method for producing marks or perforations on a moving product of claim 47, further comprising the step of adjusting at least one of a focal distance of the beam and a diameter of the beam at a focussing point by providing signals to the optical system from the control unit.

* * * * *